Oct. 12, 1965   R. ANDRIS   3,211,034
DIE ARRANGEMENT
Filed Sept. 2, 1960   5 Sheets-Sheet 1

Oct. 12, 1965 R. ANDRIS 3,211,034
DIE ARRANGEMENT
Filed Sept. 2, 1960 5 Sheets-Sheet 5

FIG. 6

INVENTOR.
Raimund Andris
BY Michael S. Striker
Attorney

United States Patent Office 3,211,034
Patented Oct. 12, 1965

3,211,034
DIE ARRANGEMENT
Raimund Andris, Pfaffenweiler, Black Forest, Germany, assignor to Kienzle Apparate G.m.b.H., Villingen, Black Forest, Germany
Filed Sept. 2, 1960, Ser. No. 53,641
Claims priority, application Germany, Sept. 2, 1959, K 38,601
12 Claims. (Cl. 83—137)

The present invention relates to die arrangements, and more specifically to blanking die arrangements for blanking portions out of a sheet metal member.

In blanking out portions from a sheet metal member in a blanking die it is sometimes of great importance that the cut faces of the blanked out portions are completely smooth and extend perpendicular to the opposite main surfaces of the sheet metal member to be blanked in the die. This is especially of importance when the cut faces of the blanked out portions have to perform certain functions which will require perfectly smooth faces. Such perfectly smooth cut faces are not obtained in blanking dies of usual construction, in which only a third of the thickness of the sheet metal member to be blanked is actually cut with smooth faces by the cooperation of the cutting edge of the die member with the cutting edge of the punch member, whereas the remainder of the sheet metal cross section is actually not cut, but breaks with a more or less rough surface. Blanks obtained from blanking dies of known constructions have therefore to be finished further at the cut faces thereof whenever perfectly smooth cut faces are required for the proper function thereof.

Several ways have already been suggested to overcome this disadvantage of common blanking dies. One of the ways consists in providing a blanking die and operating mechanism therefor, which is operated in such a manner that the material to be blanked is cut only partly from one side thereof, whereas the final cutting operation is performed from the other side of the sheet metal member. For such an arrangement two cutting members are required which are adapted to act from opposite sides of the sheet metal member and each of which has to be movable in sequence from opposite sides into the sheet metal member. This requires a relatively complicated drive mechanism for the die. Furthermore, the cutting operation will be relatively slow, since one of the cutting members has to be moved first after which the drive mechanism has to be switched to drive the other of the cutting members in opposite direction.

Another way of producing substantially smooth cutting faces during the blanking operation of the sheet metal member is to reduce the clearance between punch and die member to a minimum, that is to a few tenths of a thousandth of an inch. Such dies, however, are extremely expensive to manufacture, and the wear on the cooperating members is considerable so that these members have to be reground or replaced after a relatively short run.

One object of the present invention is to avoid these disadvantages of cutting dies according to the prior art.

It is an additional object of the present invention to provide for a cutting die arrangement which will produce substantially smooth cut surfaces.

It is a further object of the present invention to provide for a blanking die which will stand up for considerable time, which can be operated at great speed and which will produce substantially smooth cut surfaces.

It is yet an additional object of the present invention to provide for such a blanking die which is composed of relatively few and simple parts.

With these objects in view, the die arrangement of the present invention includes a first cutting member having at an end face thereof a first cutting edge, a second member spaced from said first cutting member and having at an end face thereof facing the end face of the first cutting member a second cutting edge parallel to and substantially aligned with said first cutting edge and in which one of the members is movable with respect to the other member so that the cutting edges will cooperate with each other to cut a sheet member arranged between the end faces. According to the present invention a projection of triangular cross section is provided on one of said cutting members extending along the cutting edge thereof away from the end face thereof and having a free edge substantially parallel and transversely spaced from the cutting edge thereof. The projection of triangular cross section will best be arranged on that cutting member, whose end face abuts against those portions of the sheet metal which form, after the cutting operation, the scrap.

If the die is constructed as a blanking die, for instance for blanking portions out of sheet metal, which portions shall later on be used then the die arrangement according to the present invention will include a first cutting member having an end face and being formed with a cavity of a predetermined cross sectional area extending from this end face into the first cutting member and defining in the region of said end face a peripheral cutting edge, a second cutting member spaced, when the die is in open position, from the first cutitng member and having a cross sectional area slightly smaller than said predetermined cross sectional area of the cavity and formed at an end face thereof facing the end face of the first cutting member a peripheral cutting edge congruent to the cutting edge of the first cutting member. One of the members is movable toward the other member so that the second cutting member may enter the cavity to cut a sheet metal member located between the end faces. The blanking die according to the present invention also includes an annular projection having a triangular cross section and extending along the cutting edge of the first cutting member away from said end face thereof and having a free edge substantially equidistant from the cutting edge thereof and spaced further from the other member than the clearance between the second cutting member in the cavity. In this case the projection of triangular cross section has the effect of concentrating the sheet metal particles from the exterior of the cut faces as will be explained in greater detail below.

If the die is constructed to cut holes into sheet metal, where the holes have to be furnished with smooth cut faces then the arrangement of the projection with triangular cross section will be such that a concentration of the sheet metal particles wil lbe effected from the interior of the cut faces, which means that the projection has to be provided for on that cutting member which enters the cavity in the other cutting member.

The die of the present invention may also include a pressure pad arranged about the punch member and having an end face located in a rest position, when the die is open, substantially flush with the end face of the punch member. This pressure pad is movable away from the rest position thereof in direction of movement of the die member during closing of the die when the free edge of the projection engages a sheet metal member resting on the end face of the pressure pad. The die of the present invention may also include a spring pressed ejector means located in the cavity of the die member and having an end face located in a rest position, when the die is open, substantially flush with the cutting edge of the die member. This ejector means is movable during closing of the die away from the rest position thereof in a direction opposite to the movement of the die member when the end face of the ejector means contacts a portion of the sheet metal member blanked out from the remainder of the sheet metal member during die closing.

Extensive experiments have shown that the die according to the present invention provides for considerable advantages over common blanking dies according to the prior art. In the arrangement according to the invention, the annular projection extending about the cutting edge of the cutting members will penetrate, during closing of the die, into a sheet metal member arranged between the end faces of the cooperating first and second cutting members, which will result in a concentration of the particles of the sheet material to be cut in the region critical for the cut, that is in the region in which the material used to break out during the cutting operation. In other words, the annular projection initiates the cutting operation and the inner beveled annular face of the projection will push the material of the sheet metal member towards the cutting edge of the cutting members so that during the actual cutting operation a partial break-out of the material of the sheet metal member at the cut face thereof will be prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1a shows the members before the start of the cutting operation and FIG. 1e shows the members at the end of the cutting cycle;

Figure 3:
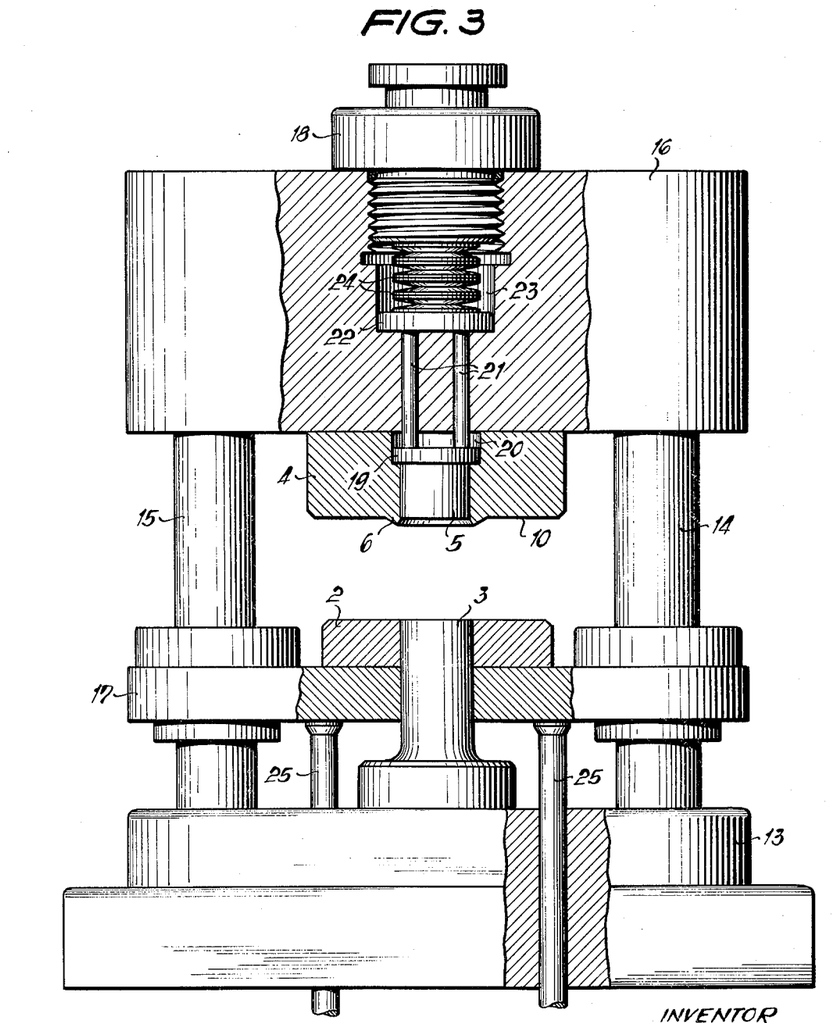
FIG. 3 is a partial section elevational view of a blanking die arrangement according to the present invention.

Referring now to the drawings and more particularly to FIG. 3 of the same, it will be seen that the blanking die according to the present invention comprises a base 13 adapted to be mounted on the bolster plate of a punch press, preferably an excentric press, not shown in the drawing. Fixed to the base 13 and projecting upwardly therefrom are the guide posts 14 and 15, the upper ends thereof snugly extend through bushings, not shown in the drawing, provided in the die holder 16, so that the latter is guided by the posts 14 and 15 for movement toward and away from the base 13. Located substantially at the center of the die holder 16 and projecting from the upper surface thereof is a coupling member 18 adapted to be connected to the ram of the punch press. Mounted centrally on the die holder 16 and abutting against the bottom face thereof is the die member 4 fixed to the die holder 16 by screws and/or dowels, not shown in the drawings. The die member 4 is formed substantially at the center thereof with a die cavity 20, which is shown in the specific embodiment illustrated in FIG. 3 as a stepped cylindrical bore having an upper portion of larger diameter than the lower portion thereof. Arranged in the lower portion of the die cavity 20 is a cylindrical ejector member 5 slidably guided therein and integrally made or fixedly connected by screws or similar means to an abutment plate 19 located in the larger diameter portion of the die cavity 20 and having an upper face spaced from the bottom face of the guide holder 16. Pins 21 guided in bores of the die holder 16 abut with the lower ends thereof against the upper face of abutment plate 19 and with the upper end thereof against the bottom face of a pressure plate 22 located in a cavity 23 formed in the die holder 16. A spring means 24, preferably in the form of spring washers, is located between the upper face of the pressure plate 22 and the bottom face of an extension projecting downwardly from the coupling member 18 into the cavity 23. This projection is preferably provided with a screw thread fixedly connecting the coupling member 18 to the die holder 16. When pressure is applied to the bottom face of the ejector means 5, the same may yield in upward direction against the pressure of the spring means 24, whereas downward movement of the ejector means 5 beyond the position shown in FIG. 3 is prevented by engagement of the peripheral portion of the abutment plate 19 with the shoulder formed between the large and the small diameter portion of the cavity 20.

Figure 6:
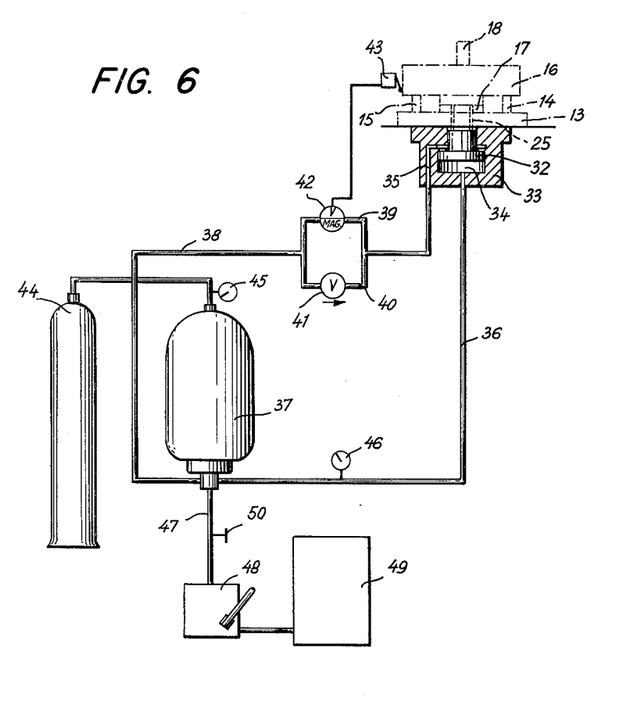
FIG. 6 shows a control arrangement for controlling certain movements of a blanking die as shown in FIG. 3.

Fixed to the upper surface of the base 13 by means of screws and/or dowels, not shown in the drawing, is a punch member 3 arranged concentric with the cavity 20 in the die member 4. The punch member 3 has, in a plane normal to the axis thereof, a cross-sectional area slightly smaller than the cross-sectional area of the small diameter portion of the cavity 20 of the die member 4 so that during closing of the die the punch 3 may enter with small clearance or sliding fit into the die cavity 20. Arranged about the punch member 3 is a pressure pad or stripper member 2 which is fixedly mounted by means of screws and/or dowels, not shown in the drawing, on the plate 17, which in turn is provided in the region of opposite ends thereof with bushings slidingly guided on the posts 14 and 15. Pressure pins 25 abut with the upper ends thereof against the bottom face of plate 17 and these pins slidingly extend through bores formed in the base plate 13 beyond the bottom face of the latter. Connected to the lower ends of the pin 25 is a pressure mechanism as schematically shown in FIG. 6, which is located in or below the bolster plate of the punch press and which is adapted to impart to the pressure pins 25 upwardly directed pressure impulses, which move the pressure pad 2 after it has been displaced in downward direction again to the position shown in FIG. 3.

The pressure mechanism connected to the pressure pad 2 will now be described with reference to FIG. 6. The pins 25 which are fixed with their upper ends to the plate 17 are fixed with the lower ends to a piston 32. This piston 32 has an upper small diameter part and a lower big diameter part and is removable in a container 33 which contains oil as fluid pressure means. The big diameter part of the piston 32 forms an abutment for the upward movement of piston 32 in container 33. The piston 32 divides the interior of the container 33 in the two pressure chambers, the lower big chamber 34 and the upper small chamber 35. The surface of the piston 32 directed towards the upper chamber 35 is smaller than the surface of the piston 32 directed towards the lower chamber 34. The lower chamber 34 is connected by means of a rubber tube 36 or such like to a pressure fluid container 37. The upper chamber 35 is connected to the same fluid container 37 over a tube 38. Inserted in the tube 38 there are two branch tubes 39 and 40. The branch tube 40 contains a one-way valve 41 which is opened in the flowing direction from the container 37 to the upper chamber 35 but which is closed in the other direction. In the branch tube 39 a magnetically operated valve 42 is inserted. The magnetically operated valve 42 is controlled by a switch 43 which cooperates with the die holder 16 in such a manner that the switch will be closed and therefore the electromagnet of the valve 42 will be actuated to close the latter when the die holder 16 is in its low, operative position. When, however, the die holder 16 is moved to its upper, open position switch 43 is opened so that valve 42 is likewise opened.

The fluid container 37 contains oil which is under nitrogen pressure. The nitrogen is supplied from a nitrogen container 44. By means of a manometer 45, it is possible to control the nitrogen pressure in the container 37 whereas by means of a manometer 46 it is possible to control the oil pressure in the container 37. The container 37 is also connected by means of a conduit 47 with a pump 48 which serves to pump oil from a storage container 49 to the pressure container 37. The pressure in the container 37 will be adjusted by pumping additional oil from the container 49 to the container 37 by means of the pump 48. This means that it is possible to adjust the pressure on the piston 32 in dependence on the sheet material used and on the thickness of such material. By means of a cock 50 container 49 and pump 48 can be cut off container 37.

In operation the control device according to FIG. 6 works as follows: In the open position of the blanking die the piston 32 is in its upper position. When the die holder 16 is lowered it closes the switch 43 so that the valve 42 is also closed. This position is shown in FIG. 6. When the die 4 comes down and presses on the pressure pad 2 oil is pressed from the lower pressure chamber 34 through tube 36 back to container 37 so that a higher pressure is built up in this container. The rest of the fluid passes through tube 38, valve 41 into the upper chamber 35 above the piston 32. While the die holder 16 is in its low position piston 32 is kept under equal pressure from both sides as no fluid can go back through valve 41 and as valve 42 is also closed. When die holder 16 is moved up switch 43 is opened and thereby also valve 42. This means that a differential pressure is now becoming effective on piston 32, as this piston 32 has a smaller effective surface on its upper side than on its lower side. This means that the pressure in the container 37 pushes piston 32 upwards while the oil, which is contained in the upper chamber 35, can evade over tube 38 and branch tube 39.

The blanking dies as shown in FIG. 3 with the exception of the control arrangement for the pressure pad as shown in FIG. 6 is conventional and while the punch 3 and the cavity in the die member 4 have been illustrated and described as cylindrical, it is understood that the punch member 3 and the cavity in the die member 4 may have any configuration as required for blanking parts or holes of desired configuration from a sheet member adapted to be located between the bottom face of the blanking die 4 and the top face of the punch member 3.

Figure 2:
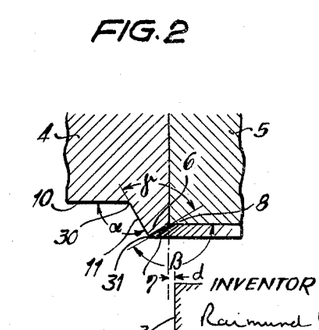
FIG. 2 is a partial cross-sectional view similar to FIG. 1a, drawn to an enlarged scale, and showing only the left portions of the members illustrated in FIG. 1a with the sheet metal member between punch and die member omitted.

According to the present invention, an annular projection 6, best shown in FIG. 2, has, in a plane extending in direction of movement of the die member 4, a triangular cross-section extending along the cutting edge 8 of the die member 4 away from the end face 10 of the die member. This annular projection has a free annular edge 31 located outwardly of the cutting edge 8 of the die member. The edge 31 is spaced in transverse direction further from the cutting edge 9 of the punch 3 than the cutting edge 8 is spaced from the punch cutting edge 9 as clearly shown in FIG. 2 in which the small clearance $d$ between the two cutting edges is indicated, this clearance being shown exaggerated in FIG. 2. Preferably, the projection 6 is arranged in such a way that the inner bevelled face 7 of the projection 6 extends between the cutting edge 8 of the die member 4 and the free edge 31 of the projection. Preferably the cutting edge 8 of the die member is spaced a small amount downwardly, that is in direction of movement of the die member 4 during closing of the blanking die, from the bottom face 10 of the die member. The angle $\alpha$ formed between the bottom face 10 of the die member 4 and the outer annular face 11 of the projection 6 is preferably slightly smaller than the angle $\beta$ which the inner face 7 of the projection 6 includes with a plane parallel to the bottom face 10. The sum of the angles $\alpha$ and $\beta$ is preferably approximately 270° so that the angle $\gamma$ formed between the annular faces 11 and 7 of the projection 6 will be substantially 90°. The cross-sectional configuration of the annular projection 6 will, however, depend on the type of material to be blanked in the blanking die of the present invention and the angles $\alpha$, $\beta$ and $\gamma$ illustrated in FIG. 2 may also have different dimensions.

Figure 1A:
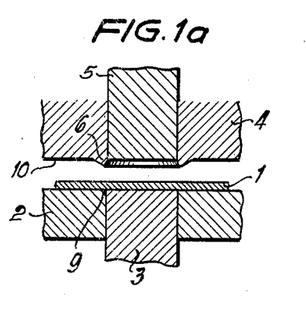
FIGS. 1a to 1e are partial cross-sectional views showing the members of the blanking die according to the present invention in successive positions these members will assume during one cutting cycle, this blanking die being constructed for cutting parts out of sheet metal, which parts shall be used.
Figure 1B:
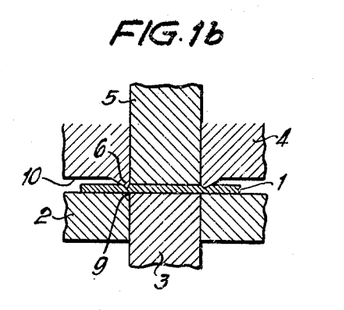
Figure 1C:
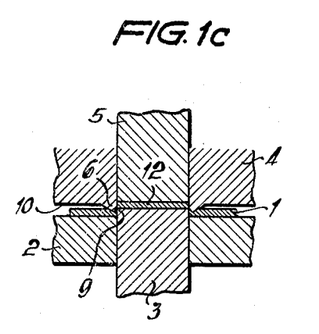

FIGS. 1a–1e show the sequence of operation during blanking of a sheet metal member 1 with the blanking die of the present invention. The blanking die as shown in FIGS. 1a–1e, 2 and 3 is designed for cutting parts out of sheet metal, which parts shall be used and shall be provided with smooth, rectangular cut surfaces. FIG. 1a illustrates the position of the various members of the blanking die when the latter is in open position as shown in FIG. 3. In the position shown in FIG. 1a, the upper surface of the pressure pad 2 is flush with the upper surface of the punch member 3 and the sheet member 1 from which portions have to be blanked out with the blanking die of the present invention rests with the bottom surface thereof on the aligned top surfaces of pressure pad 2 and punch member 3. The die member 4 is spaced in axial direction from the punch member 3 and the bottom face of the ejector 5 is flush with the cutting edge 8 of the die member 4. FIG. 1b shows the position of the members of the blanking die during the start of the cutting operation, that is when the die holder 16, shown in FIG. 3, and the die member 4 mounted thereon is moved by the punch press downwardly toward the punch member 3. In the position shown in FIG. 1b the free edge 31 of the annular projection 6 has penetrated into the sheet metal member 1, starting thereby the cutting operation and the inner annular face 7 of the projection 6, best shown in FIG. 2, will push the material of the sheet metal member 1 toward the cutting edge of the punch member. FIG. 1c shows the position of the members of the blanking die at the end of the actual cutting operation, that is when the cutting edge 8 of the die reaches the cutting edge 9 of the punch member 3. During movement of the members of the blanking die of the present invention from the position shown in FIG. 1b to the position shown in FIG. 1c, the pressure pad 2 will yield in downward direction. Since this pressure pad is under upwardly directed increasing pressure, as it moves down, the pressure pad 2 will move in downward direction through a smaller distance than the die member 4 advances and therefore the annular projection 6 will penetrate further into the material of the sheet metal member 1 until the bottom face 10 of the die member 4 nearly reaches the top face of the sheet metal member 1. This produces a further concentration of the material of the sheet metal member 1 about the cutting edge 9 of the punch member 3 and as the sheet member 1 is pressed downwardly the punch member 3 enters from the bottom into the material of the sheet metal member 1, thus blanking out a portion 12 from the remainder of the sheet metal member 1 at the end of the downward movement of the die 4. During final part of the downward movement of the die member 4, the ejector 5 will yield in upward direction against the pressure of the spring means 24.

The concentration of the material of the sheet metal member to be blanked produced by the penetration of the annular projection 6 into the material of the sheet metal member will result in the production of perfectly smooth cut faces along the periphery of the blanked out portion 12.

Figure 1D:
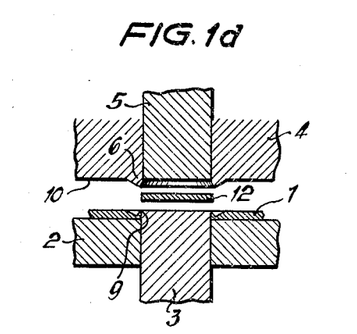
Figure 1E:
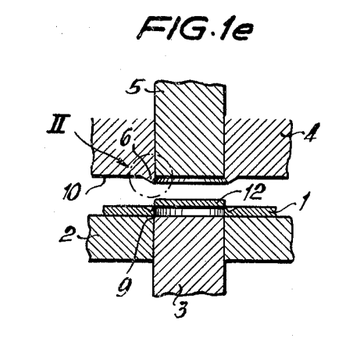

FIGS. 1d and 1e show the position of the members of the blanking die during opening movement of the die. During the first part of the opening movement the die member 4 will move away from the punch member 3 and the ejector 5 will move under the pressure of the spring means 24 in downward direction to eject the blanked out part 12 from the cavity of the die member. During the first part of the opening movement of the blanking die the pressure pad 2 is held in the position in FIG. 1d as was explained above with reference to FIG. 6 and only after the part 12 has been ejected from the die cavity, the pressure pad 2 is released and moved back to the position shown in FIG. 1d which is identical with the position of the pressure pad with respect to the punch 3 as shown in FIG. 1a. This sequence of movements will prevent pushing of the blanked out portion 12 into the remainder of the strip, which could result in damaging the cut peripheral face of the blanked out part 12.

As was already mentioned above the blanking die as shown in FIGS. 1 to 3 is a die by means of which parts can be cut out which have smooth and rectangularly shaped cut surfaces. Also, with this die arrangement the punch member 3 was fixed whereas the die member was movable. It is quite evident that in some instances a punch press could be found to be useful in which the die plate is the fixed element, whereas the punch member is movable. On the other hand, it is also possible that it is not the object of a blanking die to cut out parts but to make holes, so that the remaining part of the sheet member would be the part to be used, while the cut off portions are waste.

Figure 4A:
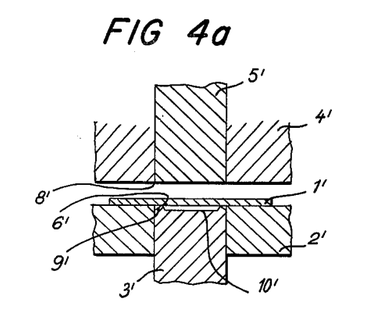
FIGS. 4a to 4f show a blanking die in various positions corresponding to FIGS. 1a to 1e, such blanking die being designed to cut holes into sheet metal which holes will be used later on, FIGS. 5a to 5e show another embodiment of a blanking die according to FIGS. 1a to 1e and 3.
Figure 4B:
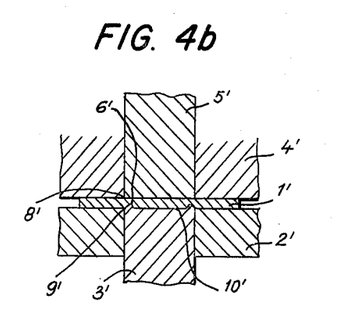
Figure 4C:
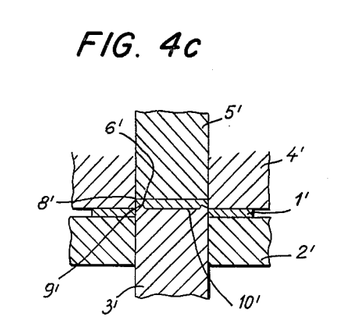
Figure 4D:
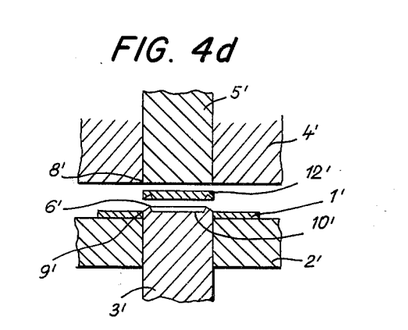
Figure 4E:
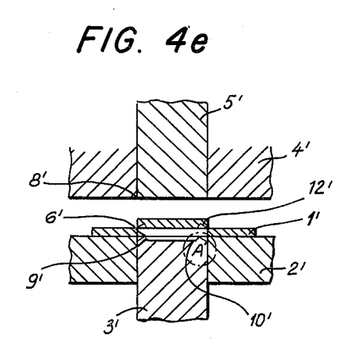
Figure 4F:
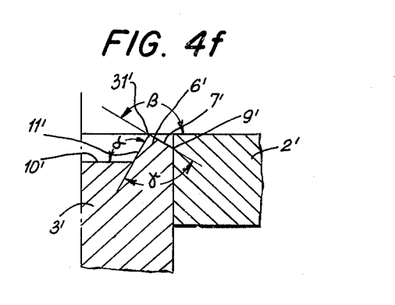

An arrangement of the latter kind is shown schematically in FIGS. 4a to 4f. In the case where holes are to be cut it is necessary that the projection of triangular cross section is designed to effect a concentration of the sheet metal particles from the inner of the cut faces so that the waste afterwards bears the marking of the projection. Therefore according to FIG. 4 the punch member 3' has been provided with the projection 6' of triangular cross section. The end face of the punch member 10' is somewhat spaced from the cutting edge 9' of this punch member 3'. FIG. 4f shows such triangular projections 6' on a large scale. A detailed description of this appears to be superfluous, as FIG. 4f is only an adaptation of FIG. 2 to the specific purpose, which latter figure has been described above.

FIGS. 4a to 4e show the various steps of the cutting operation. In FIG. 4a the sheet metal 1' has been inserted between the punch member 3' and the die member 4'. The sheet metal 1' rests on punch member 3' and on the pressure pad 2'. The cutting edge 9' of the punch is slightly below the end face of the pressure pad 2'. Above the sheet metal 1' the die member 4' is arranged, having in its cavity the ejector member 5'. The die member 4' will be moved by the punch press drive while the ejector member 5' is under spring compression. Pressure pad 2' again is connected with a control arrangement as shown in FIG. 6.

When the die is closed, as this is shown in FIG. 4b, the triangular projection 6' penetrates into the sheet metal, so that a concentration of the sheet metal particles in the region, where the cut is to be made, is accomplished. When the die member 4' moves further down a part 12' is cut out of the sheet metal 1' because of the pressure pad 2' being pressed down through the die member 4'. FIG. 4c shows again the position in which the die member 4' and the punch member 3' have cut out a part 12'. In this position the cutting edge 9' of the punch member 3' and the cutting edge 8' of the die member 4' touch each other. After this position has been reached the die member 4' is retracted so that the ejector 5' can push out the waste part 12'. Only after this been done the pressure pad 2' is moved back to its initial position as shown in FIG. 4e so that the waste part 12' is not again pushed into the hole of the sheet metal 1'.

In order to make quite clear that it is also possible with a blanking die not only to drive the die member, but, that it is also possible to drive the punch member and to arrange the die member fixedly in the punch press the embodiment according to FIGS. 5a to 5e has been shown. In these figures the die member bears the reference number 4" while the punch member bears the reference number 3". The die member is arranged fixedly in the punch press; that means it would be attached to the plate 17 of FIG. 3, while the punch member in this case would be fixed to plate 16. In this case a pad 5" will be arranged around punch member 3" and this pad 5" will be under spring action like the ejector means 5 according to FIG. 3. Arranged inside the die member 4" is a fluid operated ejector means 2". The projection 6" of triangular cross section in this case is again arranged on the die member 4", which has a cutting edge 8" while the punch member 3" is provided with a cutting edge 9".

Figure 5A:
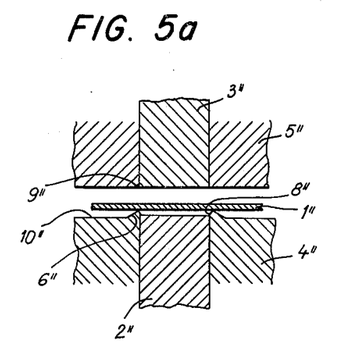
Figure 5B:
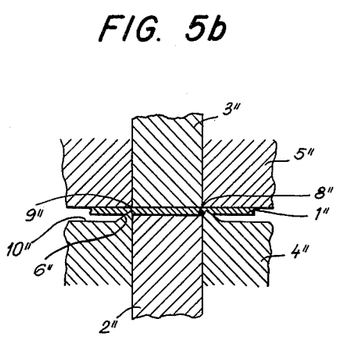
Figure 5C:
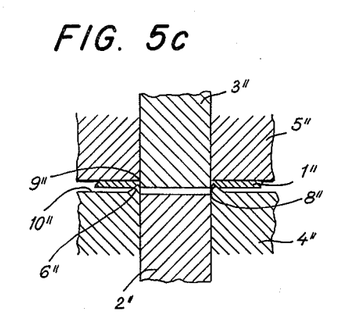
Figure 5D:
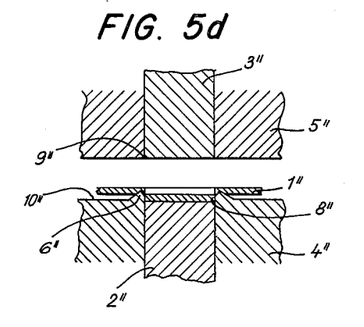
Figure 5E:
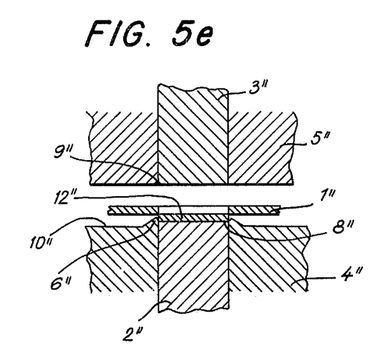

It will be seen from FIG. 5a that in this case the sheet metal is again inserted between the die member 4" and the punch member 3". The sheet metal is resting on the die member 4", especially on the triangular projection, as this is protruding above the end face 10" of the die member 4" and also above the end face of ejector member 2". When the die is closed, as this is shown in FIG. 5b, the projection of triangular cross section 6" will penetrate into the sheet material and will again effect the concentration of metal particles in the region where the cut is to be accomplished. As may be seen from FIG. 5c the punch member 3" has now been moved down while the ejector member 2" has moved backward against the fluid pressure acting thereon. The die member 4" has remained in its fixed position while the pad 5" has evaded against the spring pressure acting thereon. The cutting edges 8" and 9" touch each other which means that the cut has been completed. FIG. 5d shows that the die has been opened again. Punch member 3" has returned to its initial position and pad 5" has been pushed back to its initial position under spring pressure. Only after the die has been opened will the fluid operated ejector means 2" be moved back so that the cut out portion 12" comes to lie below the sheet metal strip 1".

It should be clear that, of course, a blanking die as shown in FIG. 3 can be adapted to the applications as shown in FIGS. 4 and 5 so that it will not be necessary to show the specific forms of blanking dies to carry out the blanking operations according to FIGS. 4 and 5.

While the invention has been illustrated and described as embodied in a punch press of normal design, especially an excentric press, it is not intended to be limited to the details shown, since various modifications and structural changes may be made without departing in any way from the spirit of the present invention. For instance the blanking dies according to the invention may also be used in presses, which are exclusively operated by fluid means.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a blanking die for blanking a sheet metal member so that at least one of the cut faces is perfectly smooth and normal to the main faces of the sheet metal, in combination, a die member having an end face and being formed with a die cavity of a predetermined cross sectional area extending from said end face into said die member and defining in the region of said end face a peripheral cutting edge; a punch member spaced from said die member and having a cross sectional area slightly smaller than said predetermined cross sectional area of said die cavity and having at an end face thereof facing said end face of said die member, a peripheral cutting edge congruent to said cutting edge of said die member, said die member being movable toward said punch member so that said punch member may enter said die cavity slightly inwardly spaced from said cavity to cut a sheet metal member located between said end faces; an annular projection having in a plane extending in direction of movement of said movable member a triangular cross section and extending along the cutting edge of said die member away from said end face thereof and having a free edge substantially equidistant from said cutting edge thereof and spaced further from the punch member than the clearance between said punch member and said die cavity, said free edge of said projection being spaced in direction of movement of said die member further from said end face of said die member than is said cutting edge thereof; and a pressure pad arranged about said punch member and having an end face located in a rest position, when said die is open, substantially flush with said end face of said punch member and said pressure pad being movable away from said rest position thereof in the direction of movement of said die member during closing of said die when said free edge of said projection engages a sheet metal member resting on said end face of said pressure pad.

2. In a blanking die for blanking a sheet metal member so that at least one of the cut faces is perfectly smooth and normal to the main faces of the sheet metal, in combination, a die member having an end face and being formed with a die cavity of a predetermined cross sectional area extending from said end face into said die member and defining in the region of said end face a peripheral cutting edge; a punch member spaced from said die member and having a cross sectional area slightly smaller than said predetermined cross sectional area of said die cavity and having at an end face thereof facing said end face of said die member, a peripheral cutting edge congruent to said cutting edge of said die member, said die member being movable toward said punch member so that said punch member may enter said die cavity slightly inwardly spaced from said cavity to cut a sheet metal member located between said end faces; an annular projection having in a plane extending in direction of movement of said movable member a triangular cross section and extending along the cutting edge of said die member away from said end face thereof and having a free edge substantially equidistant from said cutting edge thereof and spaced further from the punch member than the clearance between said punch member and said die cavity, said free edge of said projection being spaced in direction of movement of said die member further from said end face of said die member than is said cutting edge thereof; a pressure pad arranged about said punch member and having an end face located in a rest position, when said die is open, substantially flush with said end face of said punch member and said pressure pad being movable away from said rest position thereof in the direction of movement of said die member during closing of said die when said free edge of said projection engages a sheet metal member resting on said end face of said pressure pad; and spring pressed ejector means located in said cavity and having an end face located in a rest position when said die is open, substantially flush with said cutting edge of said die member, said ejector means being movable during closing of said die away from said rest position thereof in a direction opposite to the movement of said die member when said end face of said ejector means contacts a portion of said sheet metal member blanked out from the remainder of said sheet metal member during die closing.

3. In a blanking die for blanking a sheet metal member so that at least one of the cut faces is perfectly smooth and normal to the main faces of the sheet metal, in combination, a die member having an end face and being formed with a die cavity of a predetermined cross-sectional area extending from said end face into said die member and defining in the region of said end face a peripheral cutting edge; a punch member spaced from said die member and having a cross sectional area slightly smaller than said predetermined cross sectional area of said die cavity and having at an end face thereof facing said end face of said die member a peripheral cutting edge congruent to said cutting edge of said die member, said die member being movable toward said punch member so that said punch member may enter said die cavity slightly inwardly spaced from said cavity to cut a sheet metal member located between said end faces; an annular projection having in a plane extending in direction of movement of said movable member a triangular cross-section and extending along the cutting edge of said die member away from said end face thereof and having a free edge substantially equidistant from said cutting edge thereof and spaced further from the punch member than the clearance between said punch member and said die cavity, said free edge of said projection being spaced in direction of movement of said die member further from said end face of said die member than is said cutting edge thereof; a fluid operated pressure pad arranged about said punch member and having an end face located in a rest position, when said die is open, substantially flush with said end face of said punch member and said pressure pad being movable away from said rest position thereof in the direction of movement of said die member during closing of said die when said free edge of said projection engages a sheet metal member resting on said end face of said pressure pad; spring pressed ejector means located in said cavity and having an end face located in a rest position when said die is open, substantially flush with said cutting edge of said die member, said ejector means being movable during closing of said die away from said rest position thereof in a direction opposite to the movement of said die member when said end face of said ejector means contacts a portion of said sheet metal member blanked out from the remainder of said sheet metal member during die closing; and means for regulating the pressure of said pressure pad.

4. In a blanking die, for blanking sheet metal so that at least one of the cut faces is perfectly smooth and normal to the main faces of the sheet metal, in combination, a first cutting member having an end face and being formed with a cavity of predetermined cross-sectional area extending from said end face into the first cutting member and defining in the region of said end face a peripheral cutting edge; a second cutting member spaced from said first cutting member and having a cross sectional area slightly smaller than said predetermined cross sectional area of said cavity and having at an end face thereof facing said end face of said cutting member a peripheral cutting edge congruent to said cutting edge of said first cutting member, one of said members being movable toward the other member so that said second cutting member may enter said cavity to cut a sheet metal located between said end faces; an annular projection of triangular cross section extending along the cutting edge of one of said cutting members and having a free edge substantially equidistant from the cutting edge of said one member and spaced further from the cutting edge of the other member than the clearance between said second cutting member and said cavity of said first cutting member, said free edge of said projection being spaced in direction of said movement further from said end face of said one cutting member than is the cutting edge thereof so that said free edge will penetrate into the sheet metal during movement of one of said members toward the other member before the cutting edge of said one member engages the sheet metal; and yieldable pressure pad means surrounding said second cutting member.

5. In a blanking die for blanking a sheet metal so that at least one of the cut faces is perfectly smooth and normal to the main faces of the sheet metal, in combination, a die member having an end face and being formed with a die cavity of a predetermined cross-sectional area extending from said end face into said die member and defining in the region of said end face a peripheral cutting edge; a punch member spaced from said die member and having a cross-sectional area slightly smaller than said predetermined cross-sectional area of said die cavity and having at an end face thereof facing said end face of said die member a peripheral cutting edge congruent to said cutting edge of said die member, one of said members being movable toward the other member so that said punch member may enter into said die cavity slightly inwardly spaced from said cavity to cut a sheet metal located between said end faces; an annular projection having in a plane extending in direction of movement of said movable member a triangular cross section and extending along the cutting edge of one of said members and having a free edge substantially equidistant from the cutting edge of said one member and spaced further from the cutting edge of the other member than the distance between the two cutting edges, said free edge of said projection being spaced in direction of movement of said movable member further from said end face of said one member than is the cutting edge thereof so that during movement of said movable member toward the other member said free edge will penetrate into said sheet metal before the cutting edge of said one member engages the sheet metal; pressure pad means arranged about said punch member and having an end face, said pressure pad means being movable between a rest position in which said end face thereof is substantially flush with said end face of said punch member and a displaced position in which said end face of said pressure pad means is displaced in direction of movement of said movable member with respect to said end face of said punch member, said pressure pad means being in said rest position when said die is open and in said displaced position when said die is closed; ejector means located in said cavity and having an end face, said ejector means being movable from a rest position in which said end face thereof is substantially flush with said end face of said die member and a displaced position in which said end face of said ejector means is displaced in direction of movement of said movable member relative to said end face of said die member, said ejector means being in said rest position when said die is open and in said displaced position when said die is closed; spring means cooperating with one of said first-mentioned two means and tending to move said one means from the displaced position thereof to said rest position thereof; fluid operated means cooperating with the other of said first mentioned two means and tending to move the other of said means from said displaced position to said rest position thereof; and means cooperating with said fluid operated means for permitting said fluid operated means to move said other of said first mentioned two means from said displaced to said rest position only after the die has opened.

6. In a blanking die for blanking sheet-metal so that at least the cut face on the sheet metal part which forms the end product after blanking is perfectly smooth and normal to the main faces of said sheet metal part comprising, in combination, a die member and a punch member movable with respect to each other in axial direction between an open position in which said members are axially spaced from each other and a closed position in which said punch member protrudes partly into said die member, said members having cutting edges cooperating with each other during movement of said members to said closed position for blanking said sheet-metal, one of said members having a plane end face adapted to engage the part of the sheet-metal forming the end product and the cutting edge of said one member being located in said end face thereof, the other member being formed with a projection extending along the cutting edge thereof and having in a plane extending in said axial direction a triangular cross section, said projection having a free edge uniformly spaced in transverse direction a small distance from said cutting edge of said other member and said free edge being in the open position of the die closer to said end face of said one member than is the cutting edge of the other member so that during closing of said die said free edge will penetrate into the sheet metal before said cutting edge of said other member engages the sheet metal; a pressure member having an end face opposite said projection and being in a rest position when said die is open substantially flush with said plane end face of said one member; and pressure exerting means supporting said pressure member tending to maintain said pressure member in said rest position and permitting yielding of said pressure member upon penetration of said projection into said sheet metal.

7. In a blanking die for blanking sheet-metal so that at least the cut face on the sheet metal part which forms the end product after blanking is perfectly smooth and normal to the main faces of said sheet metal part comprising, in combination, a die member and a punch member movable with respect to each other in axial direction between an open position in which said members are axially spaced from each other and a closed position in which said punch member protrudes partly into said die member, said members having cutting edges cooperating with each other during movement of said members to said closed position for blanking said sheet-metal, one of said members having a plane end face adapted to engage the part of the sheet-metal forming the end product and the cutting edge of said one member being located in said end face thereof, the other member being formed with a projection extending along the cutting edge thereof and having in a plane extending in said axial direction a triangular cross section, said projection having a free edge uniformly spaced in transverse direction a small distance from said cutting edge of said other member and said free edge being in the open position of the die closer to said end face of said one member than is the cutting edge of the other member so that during closing of said die said free edge will penetrate into the sheet metal before said cutting edge of said other member engages the sheet metal; a pressure member having an end face opposite said projection and being in a rest position when said die is open substantially flush with said plane end face of said one member; pressure exerting means supporting said pressure member tending to maintain said pressure member in said rest position and permitting yielding of said pressure member upon penetration of said projection into said sheet metal; and means for regulating the pressure exerted by said support means on said pressure member.

8. In a blanking die for blanking sheet-metal so that at least the cut face on the sheet metal part which forms the end product after blanking is perfectly smooth and normal to the main faces of said sheet metal part comprising, in combination, a die member and a punch member movable with respect to each other in axial direction between an open position in which said members are axially spaced from each other and a closed position in which said punch member protrudes partly into said die member, said members having cutting edges cooperating with each other during movement of said members to said closed position for blanking said sheet-metal, one of said members having a plane end face adapted to engage the part of the sheet-metal forming the end product and the cutting edge of said one member being located in said end face thereof, the other of said members having an end face substantially parallel to said end face of said one member and being formed with a substantially annular projection having in a plane extending in said axial direction a triangular cross section, said projection having a free edge uniformly spaced in transverse direction a small distance from said cutting edge of said other member and said free edge being in the open position of the die closer to said end face of said one member than is the cutting edge of said other member, said end face of said other member being spaced in the open position of the die farther from the end face of said one member than the cutting edge of said other member is spaced therefrom so that during closing of said die said free edge will penetrate into the sheet metal before said cutting edge of said other member engages the sheet metal; a pressure member having an end face opposite said projection and being in a rest position when said die is open substantially flush with said plane end face of said one member; and pressure exerting means supporting said pressure member tending to maintain said pressure member in said rest position and permitting yielding of said pressure member upon penetration of said projection into said sheet metal.

9. In a blanking die for blanking sheet-metal so that at least the cut face of the sheet metal part which forms the end product after blanking is perfectly smooth and normal to the main faces of said sheet metal part comprising, in combination, a die member and a punch member movable with respect to each other in axial direction between an open position in which said members are axially spaced from each other and a closed position in which said punch member protrudes partly into said die member, said members having cutting edges cooperating with each other during movement of said members to said closed position for blanking said sheet-metal, one of said members having a plane end face adapted to engage the part of the sheet-metal forming the end product and the cutting edge of said one member being located in said end face thereof, the other member being formed with a projection extending along the cutting edge thereof and having in a plane extending in said axial direction a triangular cross section, said projection having a free edge uniformly spaced in transverse direction a small distance from said cutting edge of said other member and said free edge being in the open position of the die closer to said end face of said one member than is the cutting edge of the other member so that during closing of said die said free edge will penetrate into the sheet metal before said cutting edge of said other member engages the sheet metal, said projection having one inclined face directed toward the cutting edge of said one member and extending between said free edge of said projection and said cutting edge of said other member; a pressure member having an end face opposite said projection and being in a rest postion when said die is open substantially flush with said plane end face of said one member; and pressure exerting means supporting said pressure member tending to maintain said pressure member in said rest position and permitting yielding of said pressure member upon penetration of said projection into said sheet metal.

10. A blanking die as set forth in claim 9 in which said projection has another inclined face intersecting said one inclined face along said free edge of said projection, said other inclined face including with a face of said other member parallel to said end face of said one member an angle slightly smaller than the angle included by said one inclined face with said of said other member, and in which the sum of said angles is about 270°.

11. In a blanking die for blanking sheet-metal so that at least the cut face on the sheet metal part which forms the end product after blanking is perfectly smooth and normal to the main faces of said sheet metal part comprising, in combination, a die member and a punch member movable with respect to each other in axial direction between an open position in which said members are axially spaced from each other and a closed position in which said punch member protrudes partly into said die member, said members having cutting edges cooperating with each other during movement of said members to said closed position for blanking said sheet-metal, one of said members having a plane end face adapted to engage the part of the sheet-metal forming the end product and the cutting edge of said one member being located in said end face thereof, the other member being formed with a projection extending along the cutting edge thereof and having in a plane extending in said axial direction a triangular cross section, said projection having a free edge uniformly spaced in transverse direction a small distance from said cutting edge of said other member and said free edge being in the open position of the die closer to said end face of said one member than is the cutting edge of the other member so that during closing of said die said free edge will penetrate into the sheet metal before said cutting edge of said other member engages the sheet metal; a pressure member having an end face opposite said projection and being in a rest position when said die is open substantially flush with said plane end face of said one member; pressure exerting means supporting said pressure member tending to maintain said pressure member in said rest position and permitting yielding of said pressure member upon penetration of said projection into said sheet metal; and means cooperating with said support means for maintaining said pressure member in its yielded position until said die has opened and for releasing said pressure member in said open position of the die so that the same may return to its rest position.

2. In a blanking die for blanking sheetmetal so that at least the cut face on the sheet metal part which forms the end product after blanking its perfectly smooth and normal to the main faces of said sheet metal part comprising, in combination, a die member and a punch member movable with respect to each other in axial direction between an open position in which said members are axially spaced from each other and a closed position, said members having cutting edges cooperating with each other during movement of said members to said closed position for blanking said sheet metal, one of said members having a plane end face adapted to engage the part of the sheet-metal forming the end product and the cutting edge of said one member being located in said end face thereof, the other member being formed with a projection extending along the cutting edge thereof and having in a plane extending in said axial direction a triangular cross section, said projection having a free edge uniformly spaced in transverse direction a small distance from said cutting edge of said other member and said free edge being in the open position of the die closer to said end face of said one member than is the cutting edge of the other member so that during closing of said die said free edge will penetrate into the sheet metal befoer said cutting edge of said other member engages the sheet metal; a pressure member having an end face opposite said projection and being in a rest position when said die is open substantially flush with said plane end face of said one member; and pressure exerting means supporting said pressure member tending to maintain said pressure member in said rest position and permitting yielding of said pressure member upon penetration of said projection into said sheet metal.

References Cited by the Examiner

UNITED STATES PATENTS

| | | |
|---|---|---|
| 2,212,886 | 8/40 | Ruland. |
| 2,371,734 | 3/45 | Buttress _______________ 83—55 |
| 2,379,003 | 6/45 | Hedberg _______________ 83—137 |
| 2,758,652 | 8/56 | Novinger et al. __________ 83—82 |
| 2,970,503 | 2/61 | Chevallier _____________ 83—128 |
| 3,064,511 | 11/62 | Allander ______________ 83—698 |

FOREIGN PATENTS 1,093,436   2/54   France.

WILLIAM W. DYER, Jr, *Primary Examiner.*

CARL W. TOMLIN, *Examiner.*